(12) United States Patent
Cho et al.

(10) Patent No.: US 11,510,182 B2
(45) Date of Patent: Nov. 22, 2022

(54) RESOURCE MANAGEMENT METHOD AND APPARATUS IN USER-CENTRIC WIRELESS NETWORK

(71) Applicant: ELECTRONICS AND TELECOMMUNICATIONS RESEARCH INSTITUTE, Daejeon (KR)

(72) Inventors: Seung Kwon Cho, Daejeon (KR); Kyoung Seok Lee, Daejeon (KR); Soo Jung Jung, Sejong-si (KR); Tae Gyun Noh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/096,238

(22) Filed: Nov. 12, 2020

(65) Prior Publication Data

US 2021/0160823 A1    May 27, 2021

(30) Foreign Application Priority Data

Nov. 18, 2019  (KR) .................. 10-2019-0147871
Nov. 10, 2020  (KR) .................. 10-2020-0149119

(51) Int. Cl.
*H04W 72/04* (2009.01)
*H04L 27/26* (2006.01)

(52) U.S. Cl.
CPC ......... *H04W 72/04* (2013.01); *H04L 27/2601* (2013.01)

(58) Field of Classification Search
CPC ..... H04W 72/04; H04W 16/00; H04W 36/06; H04W 72/12; H04L 27/2601; H04L 1/0001; H04L 5/00; H04B 7/024
See application file for complete search history.

(56) References Cited

U.S. PATENT DOCUMENTS

2014/0031049 A1    1/2014  Sundaresan et al.
2014/0293904 A1*  10/2014  Dai ..................... H04B 7/0452
                                              370/329
(Continued)

FOREIGN PATENT DOCUMENTS

WO        2014/000602 A1    1/2014

OTHER PUBLICATIONS

Yi Li, et al., "Intercell interference-aware scheduling for delay sensitive applications in C-RAN", In 2017 IEEE 86th Vehicular Technology Conference(VTC-Fall), IEEE, pp. 1-5, Sep. 2017.

(Continued)

*Primary Examiner* — Ian N Moore
*Assistant Examiner* — Brian T Le
(74) *Attorney, Agent, or Firm* — LRK Patent Law Firm

(57) ABSTRACT

A resource management method performed by a CP in C-RAN system includes configuring M user-centric cells for M terminals with a plurality of ANs, and determining a number K of orthogonal resource sharing groups sharing a same orthogonal resource; selecting K user-centric cells as group headers for the K orthogonal resource sharing groups, and adding the selected K user-centric cells as group headers to the K orthogonal resource sharing groups; configuring the K orthogonal resource sharing groups by sequentially adding ungrouped user-centric cells to the K orthogonal resource sharing groups; and dividing total system resources into K orthogonal resources, and mapping the divided K orthogonal resources to the K orthogonal resource sharing groups, respectively.

17 Claims, 10 Drawing Sheets

(56) References Cited

U.S. PATENT DOCUMENTS

| | | | |
|---|---|---|---|
| 2015/0043499 A1 | 2/2015 | Yue et al. | |
| 2015/0365953 A1* | 12/2015 | Papadopoulos | H04W 72/0413 |
| | | | 370/329 |
| 2016/0119941 A1 | 4/2016 | Ko et al. | |
| 2017/0332250 A1 | 11/2017 | Ko et al. | |
| 2018/0206250 A1 | 7/2018 | Lee et al. | |
| 2018/0219656 A1 | 8/2018 | Lee et al. | |
| 2019/0165916 A1 | 5/2019 | Lee et al. | |
| 2020/0145154 A1* | 5/2020 | Black | H04B 7/0689 |
| 2021/0282062 A1* | 9/2021 | Wang | H04L 43/0888 |

OTHER PUBLICATIONS

Yan Lin et al., "Graph-based joint user-centric overlapped clustering and resource allocation in ulliadense networks", IEEE Trans. Vehicular Technology, vol. 67, No. 5, pp. 4440-4453, Dec. 2017.
S. J. Jung et al., "Technical trends in 5G UDN", ETRI, Oct. 1, 2018.

* cited by examiner

RESOURCE MANAGEMENT METHOD AND APPARATUS IN USER-CENTRIC WIRELESS NETWORK

CROSS-REFERENCE TO RELATED APPLICATIONS

This application claims priority to Korean Patent Applications No. 10-2019-0147871 filed on Nov. 18, 2019 and No. 10-2020-0149119 filed on Nov. 10, 2020 in the Korean Intellectual Property Office (KIPO), the entire contents of which are hereby incorporated by reference.

BACKGROUND

1. Technical Field

The present disclosure relates to a user-centric network, and more particularly, to a resource management method and apparatus for a network configured with a user-centric cell in which cooperative base stations are determined based on a terminal.

2. Description of Related Art

In the conventional cellular network, cell coverages covered by several base stations are configured not to overlap each other so that a service target area is served by the several base stations to enable services. In this case, an arbitrary terminal within the service target area may be connected to one or a plurality of base stations according to association criteria of the network to be provided with the services.

One of the major problems arising in connection establishment according to the association criteria of such the network is a performance degradation due to interferences received by a terminal located at a cell edge from an adjacent base station. In order to solve such the performance degradation, a plurality of base stations may constitute a cluster through technologies such as coordinated multi-point (CoMP), and performance degradation due to interferences can be alleviated through cooperation between the base stations belonging to the cluster. However, in case of terminals located at edges of the cluster, interferences received from other clusters to which they do not belong still exist, and there is a limitation that performance degradation due to the interferences cannot be avoided. This limitation is caused from a reason that cooperation between base stations within the cluster is possible, but cooperation with base stations belonging to other clusters is not possible. In order to overcome this problem, application of a cell-free massive MIMO (CFmMIMO) technology, which is a technology in which all base stations in the network cooperate without cell boundaries by expanding the range of cooperation to the entire network may also be considered. However, since the CFmMIMO technology has a structure in which all base stations cooperate with each other without the concept of the cluster consisting of some base stations among all base stations in the network, the amount of information that should be exchanged between the base stations is vast and the information should be exchanged in real time. However, due to limitations of a fronthaul network and an inter-base station network (e.g., backhaul network consisting of X2 interfaces in case of 3GPP) in a cloud radio access network (or, centralized radio access network (C-RAN)) structure in which jitter of information delivery, limitation of available bandwidth, and delivery delay exist, it is difficult to apply the structure in which all base stations cooperate with each other. Accordingly, a structure in which some of the base stations constituting the entire network form a cluster to cooperate is needed, and in this case, the performance degradation of the terminal located at the edge of the cluster may necessarily occur due to the above-described interferences between the clusters.

SUMMARY

Accordingly, exemplary embodiments of the present disclosure are directed to providing a resource management method for allocating resources to be used by each user-centric cell in a user-centric wireless network where the total time-frequency resources are used as being divided into a plurality of orthogonal resources, so that performances of terminals having lower performances are increased in consideration of interferences between user-centric cells. Also, exemplary embodiments of the present disclosure are directed to providing a central processor (CP) performing the resource management method and a C-RAN system including the CP.

In order to achieve the above-described objective, as an exemplary embodiment of the present disclosure, a resource management method performed by a central processor (CP), in a cloud radio access network (C-RAN) system configured with a plurality of access nodes (ANs) and the CP, may comprise: configuring M (M is a natural number) user-centric cells for M terminals with the plurality of ANs, and determining a number K (K is a natural number) of orthogonal resource sharing groups sharing the same orthogonal resource; selecting K user-centric cells as group headers for the K orthogonal resource sharing groups, and adding the selected K user-centric cells as group headers to the K orthogonal resource sharing groups; configuring the K orthogonal resource sharing groups by sequentially adding ungrouped user-centric cells to the K orthogonal resource sharing groups; and dividing total system resources into K orthogonal resources, and mapping the divided K orthogonal resources to the K orthogonal resource sharing groups, respectively.

The CP may include base nodes (BNs) each of which corresponds to each of the plurality of ANs and a central node (CN) for centrally controlling the BNs.

The function-splitting may be applied to each of the BNs and the ANs.

The number K of the orthogonal resource sharing groups may determine the number of reuses of orthogonal resources.

The group headers may be selected by calculating sums of weights for the M user-centric cells; and selecting user-centric cells corresponding to K largest sums of weights from the sums of weights for the M user-centric cells as the group headers.

The weight may be a weight reflecting an amount of interference between each of the M user-centric cells and each of user-centric cells that do not overlap with the each of the M user-centric cells, a throughput of a terminal associated with each of the M user-centric cells, and a throughput of a terminal associated with each of the user-centric cells that do not overlap with the each of the M user-centric cells.

The amount of interference may be measured by the terminal associated with each of the M user-centric cells, and reported to the CP.

The amount of interference may be estimated by the CP based on information on beams reported as optimal beams by the terminal associated with each of the M user-centric cells.

The CP may calculate the throughput of the terminal associated with each of the M user-centric cells by collecting information on an amount of data serviced to the terminal associated with each of the M user-centric cells during a predetermined time window.

The ungrouped user-centric cells sequentially added to the K orthogonal resource sharing groups may be determined using a bipartite matching technique.

The bipartite matching technique may be performed based on a Hungarian algorithm or an extended Kuhn-Munkres algorithm.

In order to achieve the above-described objective, as an exemplary embodiment of the present disclosure, a central processor (CP), in a cloud radio access network (C-RAN) system configured with a plurality of access nodes (ANs) and the CP, may comprise at least one processor; and a memory storing at least one instruction executable by the at least one processor, wherein when executed by the at least one processor, the at least one instruction causes the at least one processor to: configure M (M is a natural number) user-centric cells for M terminals with the plurality of ANs, and determine a number K (K is a natural number) of orthogonal resource sharing groups sharing the same orthogonal resource; select K user-centric cells as group headers for the K orthogonal resource sharing groups, and add the selected K user-centric cells as group headers to the K orthogonal resource sharing groups; configure the K orthogonal resource sharing groups by sequentially adding ungrouped user-centric cells to the K orthogonal resource sharing groups; and divide total system resources into K orthogonal resources, and map the divided K orthogonal resources to the K orthogonal resource sharing groups, respectively.

The at least one instruction may further cause the at least one processor to select the group headers by calculating sums of weights for the M user-centric cells; and selecting user-centric cells corresponding to K largest sums of weights from the sums of weights for the M user-centric cells as the group headers.

The weight may be a weight reflecting an amount of interference between each of the M user-centric cells and each of user-centric cells that do not overlap with the each of the M user-centric cells, a throughput of a terminal associated with each of the M user-centric cells, and a throughput of a terminal associated with each of the user-centric cells that do not overlap with the each of the M user-centric cells.

The amount of interference may be measured by the terminal associated with each of the M user-centric cells, and reported to the CP.

The CP may calculate the throughput of the terminal associated with each of the M user-centric cells by collecting information on an amount of data serviced to the terminal associated with each of the M user-centric cells during a predetermined time window.

The ungrouped user-centric cells sequentially added to the K orthogonal resource sharing groups may be determined using a bipartite matching technique.

In order to achieve the above-described objective, as an exemplary embodiment of the present disclosure, a resource management method performed by a central processor (CP), in a cloud radio access network (C-RAN) system configured with a plurality of access nodes (ANs) and the CP, may comprise: configuring M (M is a natural number) user-centric cells for M terminals with the plurality of ANs, and collecting information on beams selected for serving the M terminals from each of the M user-centric cells; estimating positions of the M terminals based on the collected information on the beams; and performing resource management for the M terminals based on the estimated positions of the M terminals.

The CP may include base nodes (BNs) each of which corresponds to each of the plurality of ANs and a central node (CN) for centrally controlling the BNs.

An amount of interference between each of the M user-centric cells and each of user-centric cells that do not overlap the each of the M user-centric cells may be calculated based on the estimated positions of the M terminals, and resource management for the M terminals may be performed on the amount of interference.

According to exemplary embodiments of the present disclosure, when dividing the total resources of the user-centric wireless network into a plurality of orthogonal resources and allocating the orthogonal resource to each of the terminals, interferences may be considered, thereby enhancing performance (e.g., throughput or spectral efficiency) of a terminal having a lower performance. In addition, resource allocation may be performed such that a sum of throughputs of terminals sharing the same orthogonal resource group is similar to a sum of throughputs of terminals sharing different orthogonal resource groups. Accordingly, fairness of terminal throughputs may be provided by making an average throughput of terminals for each orthogonal resource similar.

DETAILED DESCRIPTION

Figure 1:
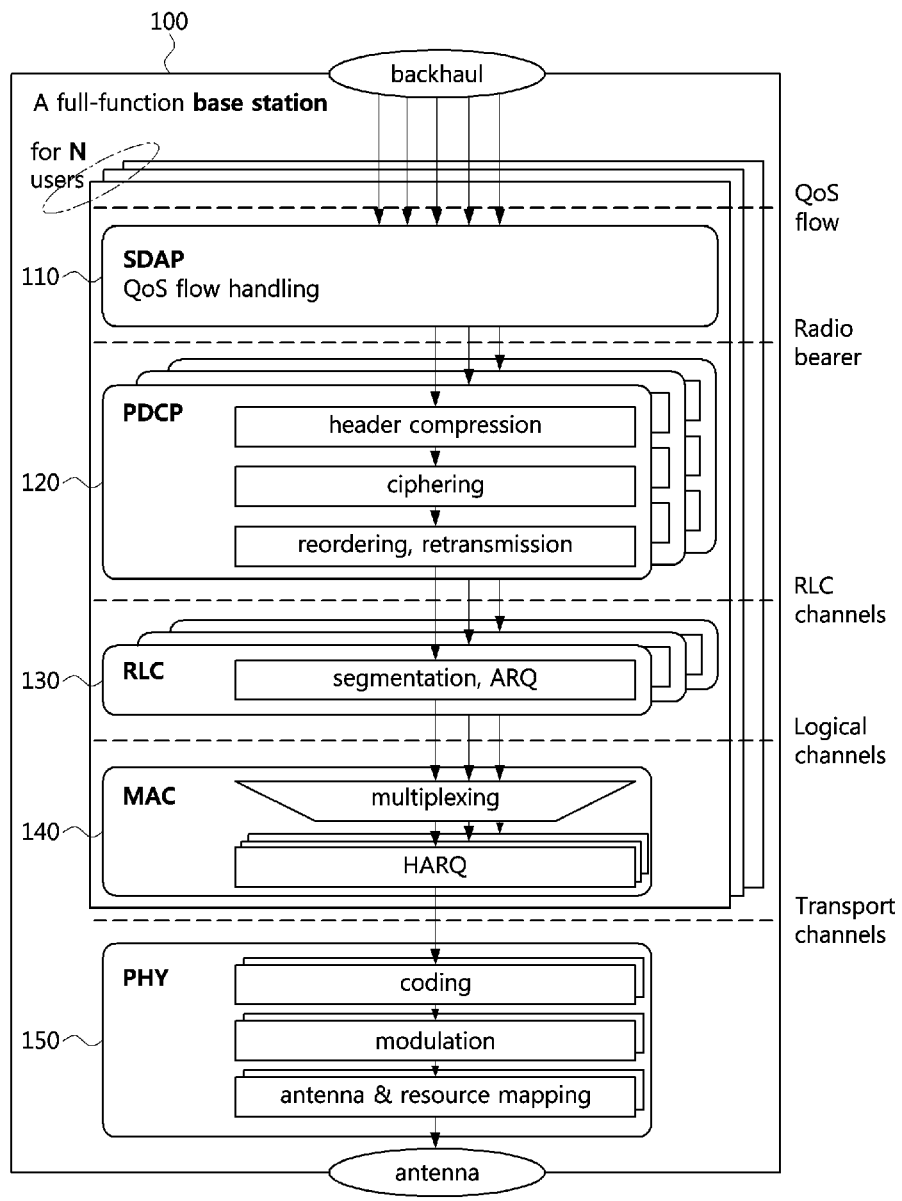
FIG. 1 is a conceptual diagram illustrating a structure of a full-function base station.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

In order to solve the performance degradation of the terminal located at the edge of the cell, compared to the terminal located in the center of the cell, a user-centric network consisting of a user-centric cell (i.e., UC cell) is being studied to overcome the disadvantages of the conventional cellular system. In the user-centric network, the same base station cannot simultaneously service a plurality of terminals, so that the total system resources may be divided into a plurality of orthogonal resources.

Exemplary embodiments of the present disclosure provide a resource management method for allocating a part of the divided orthogonal resources to each terminal in consideration of interferences in such the user-centric network. In the prior arts, since the overall network throughput was mainly considered, there was a large difference in performances between user-centric cells existing in the network. Accordingly, in order to overcome the problems of the prior arts, exemplary embodiments of the present disclosure provide a resource management method for determining a resource to be used by each user-centric cell so as to increase performance of a terminal with a lower performance in consideration of interferences between the user-centric cells.

Using the exemplary embodiments of the present disclosure, the total resources of the user-centric network are divided into a plurality of orthogonal resources, and the divided orthogonal resources are allocated to all terminals without overlapping in consideration of interferences, and thus the performance of the terminal having a lower performance (e.g., throughput or frequency efficiency (spectral efficiency)) can be improved. In addition, fairness of terminal throughputs can be provided by making the average throughput or spectral efficiency of the terminals without a significant difference.

FIG. 1 is a conceptual diagram illustrating a structure of a full-function base station.

Referring to FIG. 1, a user plane of a full-function base station having all functions necessary for wireless communications in one site is illustrated.

A full-function base station 100 may include a service data adaptation protocol (SDAP) layer 110 performing QoS flow control, a packet data convergence protocol (PDCP) layer 120 performing header compression, ciphering, and reordering/retransmission, a radio link control (RLC) layer 130 performing segmentation and automatic repeat request (ARQ), a medium access control (MAC) layer 140 performing multiplexing and hybrid automatic repeat request (HARQ), and a physical (PHY) layer 150 performing coding, modulation, and antenna/resource mapping.

Figure 2:
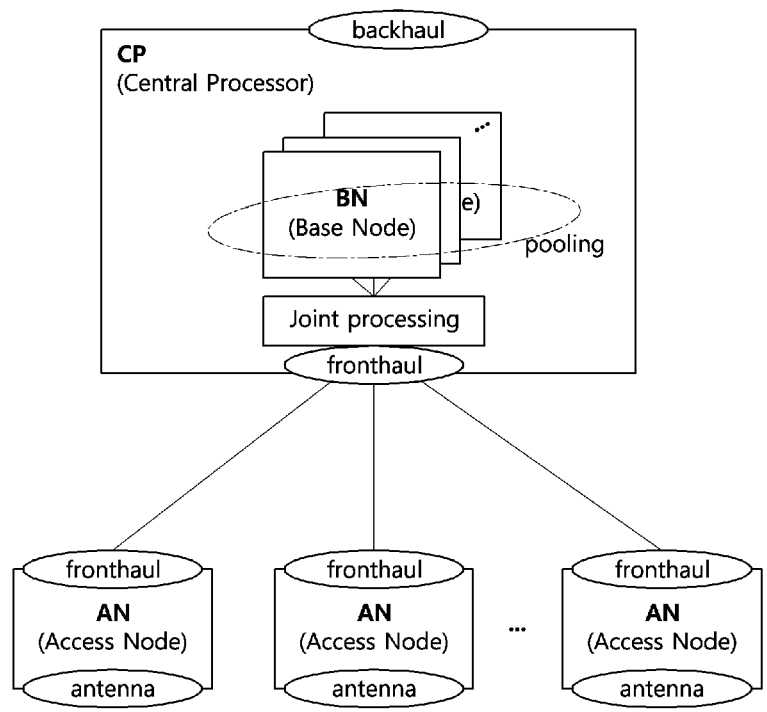
FIG. 2 is a conceptual diagram illustrating an architecture of a cloud radio access network (C-RAN).

Meanwhile, FIG. 2 is a conceptual diagram illustrating an architecture of a cloud radio access network (C-RAN).

Referring to FIG. 2, the full-function base station shown in FIG. 1 may be physically divided into two parts: a base node (BN) and an access node (AN). In addition, there may be a central processor (CP) in which a plurality of BNs are concentrated (physically or virtually) in one place. In the CP, an arbitrary BN may be connected to an AN that is physically separated to perform the role of one full-function base station. In addition, in the CP, the BNs may communicate with each other without delay, jitter, and bandwidth limitations.

Figure 3:
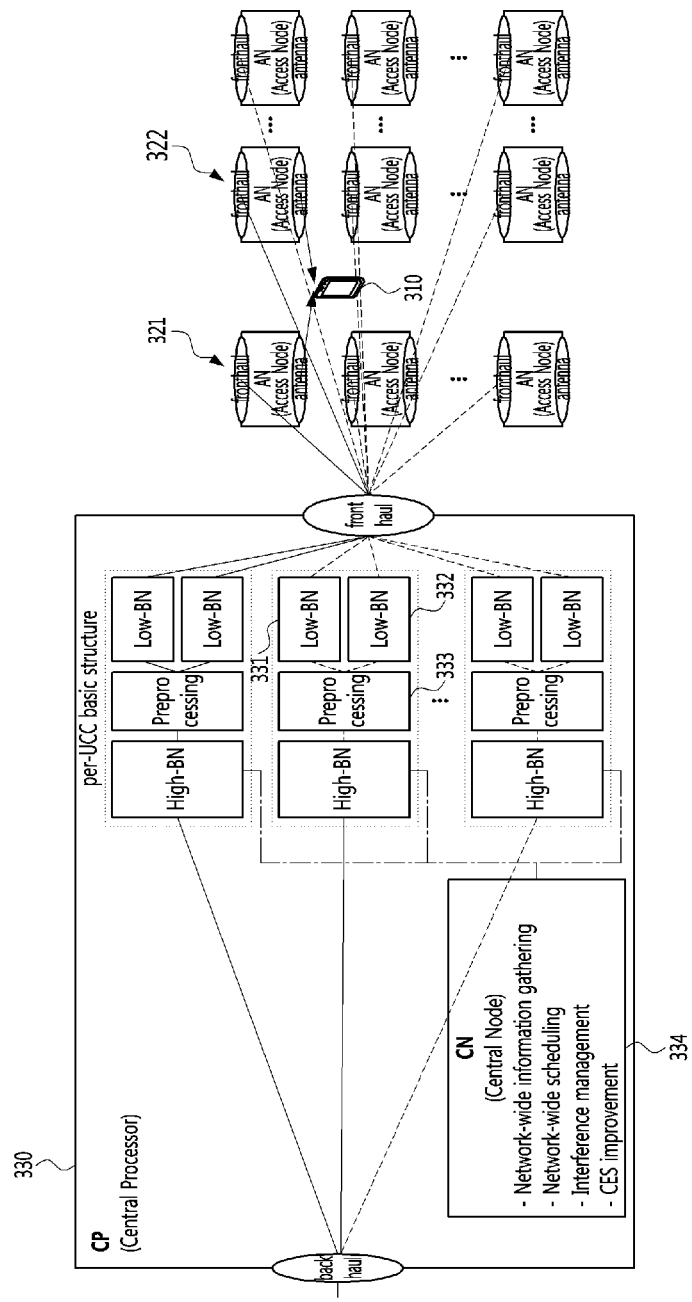
FIG. 3 is a conceptual diagram illustrating a more detailed structure of a C-RAN architecture in terms of a user-centric cell.

FIG. 3 is a conceptual diagram illustrating a more detailed structure of a C-RAN architecture in terms of a user-centric cell.

Referring to FIG. 3, one terminal 310 may perform transmission/reception with a plurality of ANs (e.g., 321 and 322). That is, as will be described later, the ANs 321 and 322 may form a user-centric cell (UCC) for the terminal 310. Each of the ANs 321 and 322 connected to the terminal 310 may be connected to a BN in a CP 330. Meanwhile, each of the BNs shown in FIG. 2 may be configured in a structure where it is divided into one High-BN and a plurality of Low-BNs, and the two ANs 321 and 322 shown in FIG. 3 may be connected to the Low-BNs 331 and 332, respectively.

The High-BN is a functional block that performs common functions in one user-centric cell in the C-RAN architecture. That is, the High-BN is a functional block that collects information necessary for operations of the user-centric cell, and provides high-level commands necessary for determination, decision, and execution for the user-centric cell using the collected information. The High-BN may include some functions of layer 3 (L3) and layer 2 (L2) of a radio communication protocol. The High-BN may be connected to a plurality of Low-BNs through a processing block 333. FIG. 2 shows an example in which each High-BN is connected to two Low-BNs, but each High-BN may be connected to a larger number of Low-BNs. The processing block 333 is a block that performs common calculations required for physical transmission for transmitting and receiving data to and from a terminal in the user-centric cell (e.g., ANs 321 and 322). For example, the common calculations may include calculation of precoding matrices used in the ANs, and the specific common calculations may vary according to a cooperative transmission technique used.

The Low-BN is a functional block that processes signals transmitted and received through each AN, and may include some functions of the L1 that are not included in the AN among the L1 functions of the radio communication protocol and some functions of the L2 that are not included in the High-BN.

The ANs 321 and 322 are functional blocks including antennas that perform physical signal transmission and reception, and may perform some functions not included in the Low-BN among the L1 functions.

Finally, a central node (CN) 334 in the CP is a functional block that may exist in the same physical position as the CP or may exist inside the CP. Specifically, the CN may be a functional block that performs collection of information on the entire C-RAN-based network considering the user-centric cell, network-wide scheduling such as resource distribution to user-centric cells, interference control between user-centric cells, and network-wide control for improving cell edge performances (i.e., cell edge spectral efficiency (CES)) to which exemplary embodiments of the present disclosure may be applied. That is, since the exemplary embodiments of the present disclosure deal with resource management for user-centric cells, the CN (or CP) may be a functional block in which the exemplary embodiments of the present disclosure are mainly implemented. Meanwhile, in the following description, centralized control may be described as being performed by the CP as an entity including the CN.

In the exemplary embodiments of the present disclosure, resource management for each user-centric cell may be performed. In addition, resource allocation in consideration of interferences between user-centric cells using the same time-frequency resources may be performed. Therefore, in the following description, a complete graph expressing a user-centric cell as a node (i.e., vertex) and expressing interference between arbitrary two user-centric cells as an edge may be used for resource allocation considering interferences. In the following descriptions, the term 'node (vertex)' may mean a 'user-centric cell', and conversely, the terminal 'user-centric cell' may mean a 'node (vertex)'. That is, for convenience of description, a node (vertex) on a graph and a user-centric cell in an actual network corresponding thereto may be described as having the same meaning. First, the resource management methods according to the exemplary embodiments of the present disclosure focus upon resource allocation in a state in which user-centric cells are configured in a C-RAN system composed of a plurality of ANs and a CP, and thus it is assumed that the user-centric cells are already configured. That is, a description of a clustering process, which is a process of determining ANs constituting a user-centric cell for each terminal, is omitted.

Figure 4:
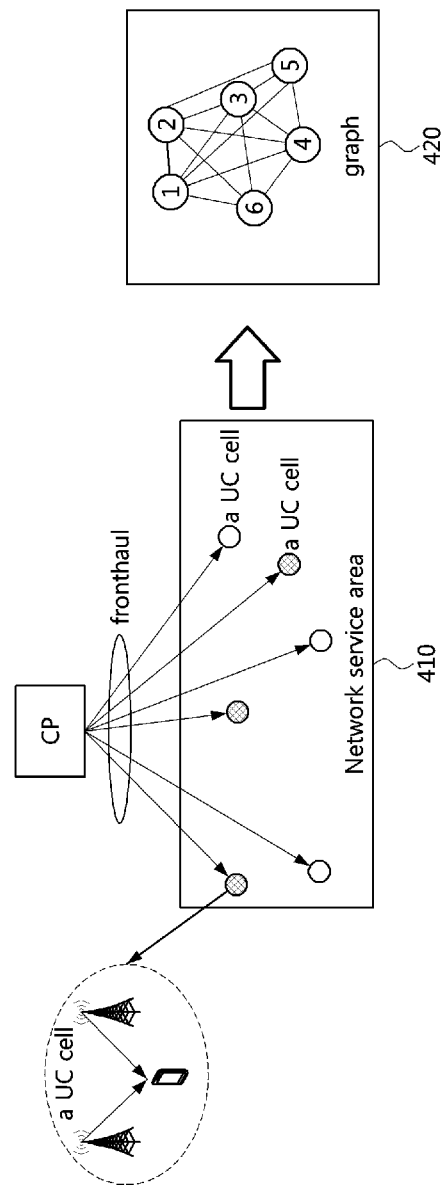
FIG. 4 is a conceptual diagram illustrating an example in which an actual network composed of user-centric cells is expressed as a complete graph.

FIG. 4 is a conceptual diagram illustrating an example in which an actual network composed of user-centric cells (UC cells) is expressed as a complete graph.

Referring to FIG. 4, when there are a total of 6 user-centric cells in a network service area 410, each of the user-centric cells may be represented as a node of a complete graph 420. In addition, an edge of the graph 420 may indicate interference between the user-centric cells. When different user-centric cells include the same AN, these user-centric cells may be expressed as overlapped. Overlapped user-centric cells may not interfere with each other when they use resources that are orthogonal to each other. Since the interference between nodes is defined as the edge of the graph, a weight of the edge may be expressed as the amount of interference between the two nodes. However, when considering beamforming, such the amount of interference between nodes may vary depending on directions of beams.

Figure 5:
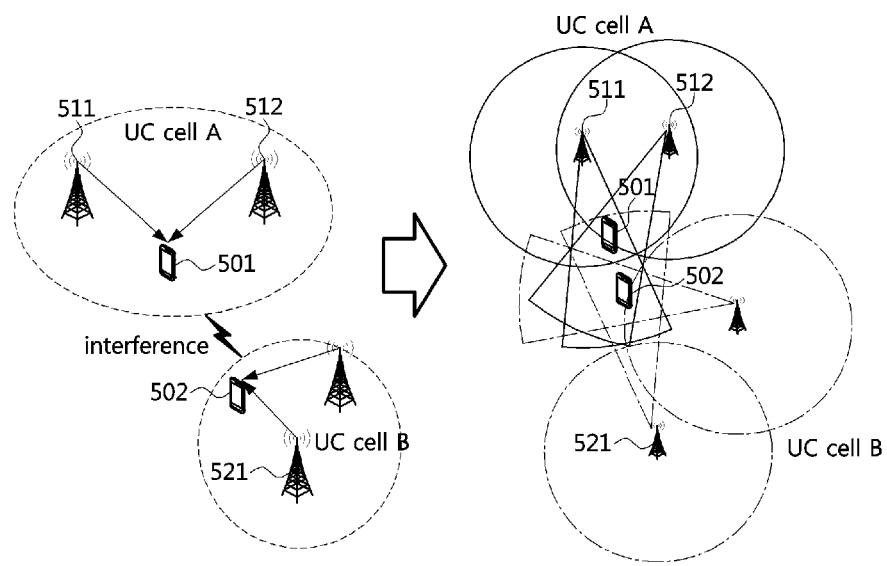
FIG. 5 is a conceptual diagram for describing interference between user-centric cells in consideration of beamforming.

FIG. 5 is a conceptual diagram for describing interference between user-centric cells in consideration of beamforming.

Referring to FIG. 5, a terminal 501 included in a user-centric cell A (UC cell A) receives interference from only one AN 521 constituting a user-centric cell B (UC cell B), but a terminal 502 included in the user-centric cell B receives interferences from both ANs 511 and 512 constituting the user-centric cell A. Accordingly, a unidirectional interference amount $I_{AB}$ from the user-centric cell A to the user-centric cell B and a unidirectional interference amount $I_{BA}$ from the user-centric cell B to the user-centric cell A may have a relationship as shown in Equation 1 below.

$$I_{AB} \neq I_{BA} \qquad \text{[Equation 1]}$$

One of major performance criteria of a user-centric cell is spectral efficiency. Therefore, the weight of the edge and the spectral efficiency may have a functional relationship expressed by Shannon's capacity formula. The spectral efficiency is a log function of a received signal strength and a total amount of interference included in the received signal. Therefore, the overall spectral efficiency may not be expressed only by interference caused by a specific user-centric cell using the same resource, whereas a decrease in the spectral efficiency of the entire system due to interference between user-centric cells may have a functional relationship with interference due to a specific user-centric cell using the same resource. That is, the spectral efficiency decrease $C^{(-)}$ of the entire system may have a relationship with $I_{AB}$ and $I_{BA}$ as shown in Equation 2 below, assuming that all other parameters are fixed.

$$C^{(-)} = f(I_{AB}, I_{BA}) \qquad \text{[Equation 2]}$$

Here, the function $f(I_{AB}, I_{BA})$ represents a function that increases as $I_{AB}$ or $I_{BA}$ increases and decreases as $I_{AB}$ or $I_{BA}$ decreases. An objective of the exemplary embodiments of the present disclosure is to provide resource allocation in consideration of interferences. In other words, when allocating resources, interference from user-centric cells using the same resource may be considered. Therefore, it is most advantageous to allow user-centric cells to share the same resource that causes the smallest spectral efficiency decrease $C^{(-)}$ of the entire system due to the interference. In the user-centric cell without the concept of a cell edge terminal, there is a need for a method of increasing throughputs through consideration of relatively reducing interference to a terminal having a lower throughput. In the exemplary embodiments of the present disclosure, since user-centric cells that share the same resource are determined based on the amount of interference, it is possible to consider that terminals having lower throughputs receive less interference when calculating the amount of interference. This may be designed as in Equation 3 below, which is a function representing the weight w.

$$w = f'(I_{AB}, I_{BA}, \bar{e}_A, \bar{r}_B) \quad \text{[Equation 3]}$$

The requirements for the weight function $f'(I_{AB}, I_{BA}, \bar{r}_A, \bar{r}_B)$ are as follows. First, as the interference increases, the weight w should increase. This is to minimize a sum of the spectral efficiency decrease $C^{(-)}$ estimated as a sum of the weights of terminals (i.e., user-centric cells) using the same resource, through resource allocation that minimizes the weights. Second, as the throughput of the corresponding terminals decreases, the weight w should increase. This is a consideration for improving the performance of the user-centric cells with lower performances. That is, for the terminal with a lower throughput (i.e., terminal that should be considered to receive less interference), the weight used for resource allocation may be considered to be larger than the amount of interference actually received by the corresponding terminal, thereby improving the throughput of the terminal and improving the performance of the user-centric cell with a lower performance.

Based on these requirements, specific exemplary embodiments of the weight function $f'(I_{AB}, I_{BA}, \bar{r}_A, \bar{r}_B)$ may be provided as follows.

(1) First Exemplary Embodiment of Weight Function

Equation 4 is a first exemplary embodiment of $f'(I_{AB}, I_{BA}, \bar{r}_A, \bar{r}_B)$.

$$f'(I_{AB}, I_{BA}, \bar{r}_A, \bar{r}_B) := \frac{I_{AB}}{\bar{r}_B^\gamma} + \frac{I_{BA}}{\bar{r}_A^\gamma} \quad \text{[Equation 4]}$$

Here, $\bar{r}_A$ and $\bar{r}_B$ are throughputs of terminals A and B in bits per second (bps), measured for each T frames, which is a non-overlapping time window of a predetermined length of time, respectively. In addition, y is an index related to how much $\bar{r}_A$ and $\bar{r}_B$ are considered, and may be defined as a fairness factor.

(2) Second Exemplary Embodiment of Weight Function

Equation 5 is a second exemplary embodiment of $f'(I_{AB}, I_{BA}, \bar{r}_A, \bar{r}_B)$.

$$f'(I_{AB}, I_{BA}, \bar{r}_A, \bar{r}_B) := \frac{(I_{AB}/I_{max})}{(\bar{r}_B^\gamma/\bar{r}_{max}^\gamma)} + \frac{(I_{BA}/I_{max})}{(\bar{r}_A^\gamma/\bar{r}_{max}^\gamma)} \quad \text{[Equation 5]}$$

Here, assuming that a set of all terminals within the network is S, and A, B, C, and D are symbols representing user-centric cells, respectively, $I_{max}$ is the maximum value of unidirectional interference within the network that satisfies Equation 6 below.

$I_{max} = I_{AB}$ for $\exists A \in S, \exists B \in S, A \neq B$ and $I_{max} \geq I_{CD}$ for $\forall C \in S, \forall D \in S, C \neq D$ [Equation 6]

Here, $\bar{r}_{max}$ is the maximum value of the throughput of the terminal within the network that satisfies Equation 7 below.

$\bar{r}_{max} = \bar{r}_A$ for $\exists A \in A$ and $\bar{r}_{max} \geq \bar{r}_B$ for $\forall B \in S$ [Equation 7]

That is, $f'(I_{AB}, I_{BA}, \bar{r}_A, \bar{r}_B)$ of the second exemplary embodiment is obtained by normalizing each denominator and numerator of $f'(I_{AB}, I_{BA}, \bar{r}_A, \bar{r}_B)$ of the first exemplary embodiment to 1.

(3) Third Exemplary Embodiment of Weight Function

Equation 8 is a third exemplary embodiment of $f'(I_{AB}, I_{BA}, \bar{r}_A, \bar{r}_B)$.

$$f'(I_{AB}, I_{BA}, \bar{r}_A, \bar{r}_B) := \left(\frac{I_{AB}}{I_{max}} + \frac{\bar{r}_A^\gamma}{\bar{r}_{max}^\gamma}\right) + \left(\frac{I_{BA}}{I_{max}} + \frac{\bar{r}_B^\gamma}{\bar{r}_{max}^\gamma}\right) \quad \text{[Equation 8]}$$

That is, compared with $f'(I_{AB}, I_{BA}, \bar{r}^A, \bar{r}_B)$ of the second exemplary embodiment, the normalized terms of $f'(I_{AB}, I_{BA}, \bar{r}_A, \bar{r}_B)$ of the third exemplary embodiment are defined by not division but addition.

(4) Fourth Exemplary Embodiment of Weight Function

Equation 9 is a fourth exemplary embodiment of $f'(I_{AB}, I_{BA}, \bar{r}_A, \bar{r}_B)$.

$$f'(I_{AB}, I_{BA}, \bar{r}_A, \bar{r}_B) := I_{AB} + I_{BA} \quad \text{[Equation 9]}$$

That is, it is an exemplary embodiment in which only the amount of interference is considered without considering the throughputs $\bar{r}_A$ and $\bar{r}_B$ of terminals A and B for each T frames, which is a non-overlapping time window of a predetermined length of time. If the throughput does not change over time, the weight does not change. Accordingly, as in the fourth exemplary embodiment in which the weight is not changed, the operations and procedures related to the time window T described below are not applied. This is because it is not necessary to update the weights for each time window when the weights that do not change over time are considered.

Usually, the amount of interference may be measured by an interfered terminal and may be reported to the CP through the ANs. Meanwhile, in an exemplary embodiment of the present disclosure, a method of estimating unidirectional interference without obtaining it by measurement may be used. This is because the actual measurement of the unidirectional interference may have the following difficulties.

Objects to be measured for interference measurement are interferences to a terminal included in a user-centric cell that receives interference from each of the ANs constituting the user-centric cell causing interference. In this case, it is possible to measure the amounts of individual interferences from ANs near the terminal, but it is difficult to measure the amounts of individual interferences from the ANs located far from the terminal. That is, when measurement based on a cell-specific reference signal (CRS) is performed, it is difficult to measure an individual interference amount with an AN located at a far distance based on orthogonality of the CRS. That is, it is unsuitable in an environment such as an ultra-dense network (UDN) in which the number of ANs is large because it limits network scalability to allow all ANs in the service area to use orthogonal CRSs.

What is needed in the exemplary embodiments of the present disclosure is to measure interferences between all nodes in the service area, that is, all user-centric cells. When the number of user-centric cells is M (i.e., the total number of terminals is M) and a user-centric cell is composed of L ANs, the number of interfering links to be measured is M L(M−1). Therefore, considering a UDN environment with a large number of ANs, the number of interfering links to be measured is impractical. For measurement, the ANs of the user-centric cell causing interference should transmit reference signals using the same time-frequency resource as the time-frequency resource used by the interfered user-centric cell. That is, an interference source transmits a reference signal, and a terminal subjected to interference may measure the interference by receiving information on transmission of the reference signal, and receiving the reference signal according to a transmission timing indicated by the corresponding information. However, if all ANs and terminals perform such the operation, the overhead may be very large and thus it is not practical. Accordingly, an exemplary embodiment of the present disclosure provides a method of estimating unidirectional interference without measurement.

First, the position of the terminal may be estimated, and a path loss may be calculated using the estimated position of the terminal and positions of ANs to which the corresponding terminal is connected. For example, the path loss $L_{AB,l}$ between a reference position of an AN l (i.e., interference source) included in the user-centric cell A and the estimated position of the terminal B (i.e., interfered terminal) in the user-centric cell B may be calculated. That is, since the network (i.e., CP) knows the position of the AN to which the terminal is connected, $L_{AB,l}$ may be easily calculated if only the position of the terminal is estimated. When the path loss is calculated, the amount of interference may be calculated by using together given other parameters (e.g., antenna gain, noise figure, thermal noise, AN transmission power, etc.). Equation 10 below is an example of calculating the weight $w_{AB}$ considering only the antenna gain for the first exemplary embodiment of the function $f'(I_{AB}, I_{BA}, \bar{r}_A, \bar{r}_B)$.

$$w_{AB} \Box \frac{I_{BA}}{\bar{r}_A^\gamma} + \frac{I_{AB}}{\bar{r}_B^\gamma} = \frac{P^t \sum_{i=1}^{L_B} G_{BA,l}/L_{BA,l}}{\bar{r}_A^\gamma} + \frac{P^t \sum_{i=1}^{L_A} G_{AB,l}/L_{AB,l}}{\bar{r}_B^\gamma} \quad \text{[Equation 10]}$$

Here, the parameters included in Equation 10 may be defined as follows.

$P^t$: AN transmission power (all ANs have the same transmission power)

$L_A$: Number of ANs included in the user-centric cell A $L_B$: Number of ANs included in the user-centric cell B $L_{AB,l}$: Path loss from the reference position of the transmission point of the AN l included in the user-centric cell A to the estimated position of the terminal in the user-centric cell B $L_{BA,l}$: Path loss from the reference position of the transmission point of the AN l included in the user-centric cell B to the estimated position of the terminal in the user-centric cell A $G_{AB,l}$: Antenna gain for the estimated position of the terminal in the user-centric cell B from the reference position of the transmission point of the AN l included in the user-centric cell A $G_{BA,l}$: Antenna gain for the estimated position of the terminal in the user-centric cell A from the reference position of the transmission point of the AN l included in the user-centric cell B $\bar{r}_A$: Throughput of the terminal A in bits per second (bps), measured for each non-overlapping time window of a certain length of time, T frames $\bar{r}_B$: Throughput of the terminal B in bits per second (bps) measured for each non-overlapping time window of a certain length of time, T frames $\gamma$: Fairness factor related to how much $\bar{r}_A$ or $\bar{r}_B$ is considered in the weight $w_{AB}$ Meanwhile, in order to calculate the path loss from the AN l belonging to the user-centric cell A to the interfered terminal of the user-centric cell B, information on the distance between the AN l and the terminal of the user-centric cell B is required as described above. In an exemplary embodiment of the present disclosure, in case of an outdoor environment, the position information of the terminal may be obtained by using a GPS or other methods. The distance information between the AN l and the terminal of the user-centric cell B may be calculated from the obtained position of the terminal and the position of the AN l that the network already knows. In another exemplary embodiment of the present disclosure, the position of the terminal may be estimated using beam indexes derived as a result of beamforming of ANs used by the terminal without obtaining the position information of the terminal by a GPS or other methods. This method is particularly suitable in cases where GPS-based localization is not possible, such as in an indoor environment.

In the clustering step of generating user-centric cells, which is performed before resource allocation, the terminal of each user-centric cell may select an optimal beam for each of all ANs in the corresponding user-centric cell. Accordingly, the CN in the CP to which the ANs are connected may know the beam indexes of the beams used for serving each terminal of all the user-centric cells within the service area by collecting them from the ANs.

Figure 6:
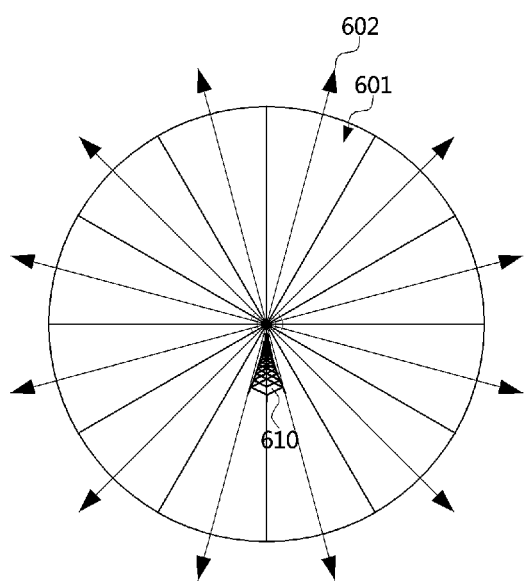
FIG. 6 is a conceptual diagram illustrating an example of beam boresights of an AN using a total of 12 beams.
Figure 7:
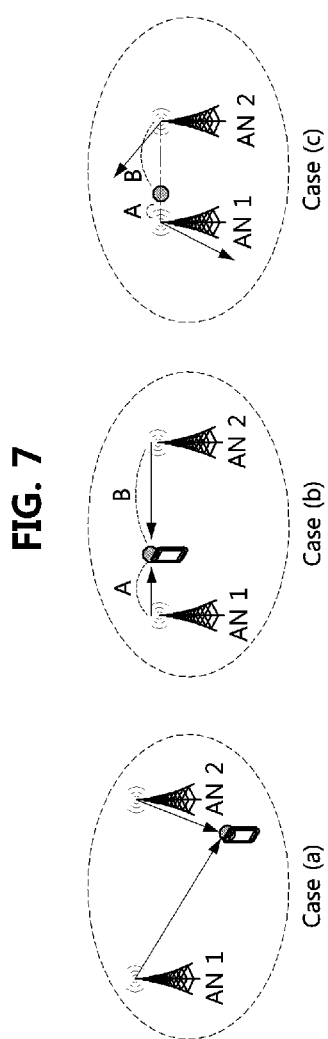
FIG. 7 is a conceptual diagram illustrating three situations of beamforming in a user-centric cell composed of two ANs.

FIG. 6 is a conceptual diagram illustrating an example of beam boresights of an AN using a total of 12 beams, and FIG. 7 is a conceptual diagram illustrating three situations of beamforming in a user-centric cell composed of two ANs.

Referring to FIG. 6, 12 beams may each cover an area corresponding to 30 degrees. For example, a beam index 1 covers an area 601 from 0 to 30 degrees based on a predetermined direction of the AN 610, and in this case, a beam boresight corresponding to the beam index 1 is a boresight 602 corresponding 15 degrees based on the predetermined direction. The CP may receive a report of a beam index of a beam measured and selected by each terminal as an optimal beam through the ANs, and the CP may estimate the position of each terminal from the collected beam indexes.

Referring to FIG. 7, a case (a) is the most common case, in which beam boresights of beams from two ANs (i.e., AN1 and AN2) meet at one point. A case (b) is a rather rare case, in which beam boresights of two beams from two ANs (i.e., AN1 and AN2) meet at a countless number of points. A case (c) rarely occurs, and is a case in which beam boresights of the two beams do not meet at any point due to wrong beam selection.

In the case (a), the CP may obtain an intersection of beam boresights known from the beam indexes of the AN1 and AN2, and estimate the position of the intersection as the position of the terminal. In the case (b), the CP may receive a report of received signal strength measurements $P_{CRS, AN1}$ and $P_{CRS, AN2}$ of CRSs of the AN1 and AN2 measured by the terminal through the respective ANs, and may obtain a distance A between the AN1 and the terminal and a distance B between the AN2 and the terminal in the following manner. That is, since the CP knows the installation positions of the AN1 and AN2, the CP may calculate the distance A and the distance B through Equation 11 below under the assumption that the received signal strength of the CRS decreases only by a path loss.

$$A:B = 1 / \sqrt[\alpha]{P_{CRS,AN1}} : 1 / \sqrt[\alpha]{P_{CRS,AN2}} \quad \text{[Equation 11]}$$

Here, α is a path loss exponent, and A+B is an inter-site distance (ISD) between the AN 1 and AN 2. On the other hand, the case (c) is a case in which beam selection is wrong, but the distances A and B may be calculated using a proportional equation as in the case (b). In this case, the terminal position estimation error may increase.

Figure 8:
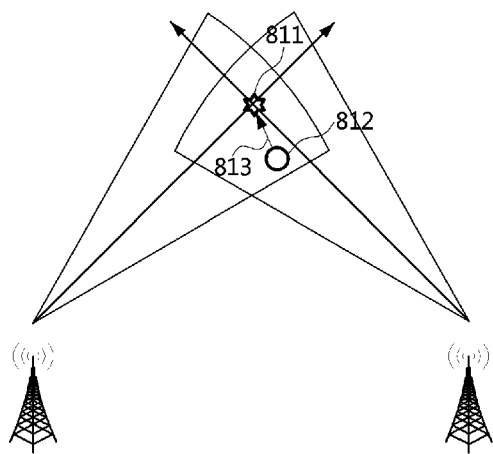
FIG. 8 is a conceptual diagram illustrating an error between an actual terminal position and an estimated position in estimating a terminal position using beam indexes according to an exemplary embodiment of the present disclosure.

FIG. 8 is a conceptual diagram illustrating an error between an actual terminal position and an estimated position in estimating a terminal position using beam indexes according to an exemplary embodiment of the present disclosure.

Referring to FIG. 8, a position estimation error 813 may exist between a position 811 of the terminal estimated using beam indexes of ANs reported from the terminal and an actual position 812 of the terminal. When a fine beam having a narrow beam width is used, such the error 813 may be further reduced. In other words, it is affected by the total number of beams generated by each AN. If the AN performs beam sweeping using a narrow beam width, the position estimation error 813 may be reduced. In addition, such the estimation error may be affected by an inter-site distance (ISD), which is a distance between the ANs. When the terminal is clustered with the nearest ANs (i.e., as the ISD decreases), the length and width of the sector-shaped regions of FIG. 8 decrease, and accordingly, the position estimation error may decrease.

In an exemplary embodiment of the present disclosure, despite such the estimation error, the position of the terminal may be estimated using beam indexes. Even when an error occurs, the error is similar to or smaller than the ISD of ANs constituting the user-centric cell. Therefore, since the estimation error is a value much smaller than the interference distance between the user-centric cells, a large difference may not occur in representing the magnitude of the relative amount of interference between the user-centric cells.

When the number of ANs in the network is N and the number of terminals is M, a flag $a_{m,n}$ ($a_{m,n} \in \{0,1\}$) may indicate whether a terminal m(m=1,2, ..., N) is associated with an AN n(n=1,2, ..., N). For example, $a_{m,n}=1$ may indicate that the terminal m is associated with the AN n, and $a_{m,n}=0$ may indicate that the terminal m is not associated with the AN n. Using the definition of $a_{m,n}$ as described above, a matrix ($A=\{a_{m,n}\} \in \{0,1\}^{M \times N}$) may be used to represent association states of all terminals and ANs in the network. That is, each row of the matrix A may correspond to a terminal, and each column may correspond to an AN.

$$A = \{a_{m,n}\} \in \{0,1\}^{M \times N} = \begin{pmatrix} a_{1,1} & a_{1,2} & \cdots & a_{1,N} \\ a_{2,1} & \ddots & & a_{2,N} \\ \vdots & & & \vdots \\ a_{M,1} & a_{M,2} & \cdots & a_{M,N} \end{pmatrix} \quad \text{[Equation 12]}$$

In order for the matrix A to be a matrix representing feasible associations between terminals and ANs in the network, the number of elements having a value of 1 in an arbitrary row should be the same as the number of ANs present in the user-centric cell including the terminal corresponding to the corresponding row. For example, supposing that each of all user-centric cells has two ANs, Equation 13 is a feasible example of a 3×4 matrix A.

$$\begin{pmatrix} 1 & 1 & 0 & 0 \\ 0 & 1 & 1 & 0 \\ 0 & 0 & 1 & 1 \end{pmatrix} \quad \text{[Equation 13]}$$

Figure 9:
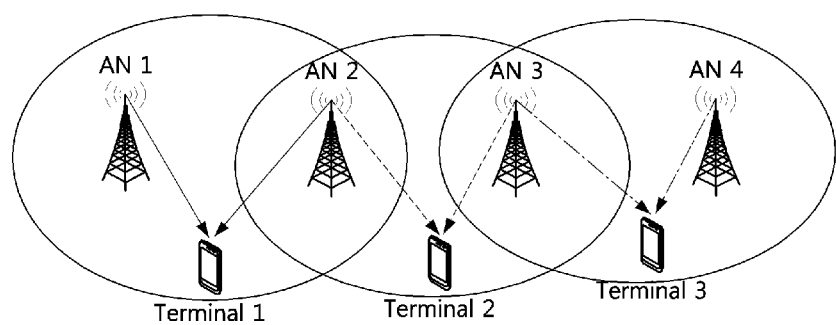
FIG. 9 is a conceptual diagram illustrating an example of associations between user-centric cells and terminals.

FIG. 9 is a conceptual diagram illustrating an example of associations between user-centric cells and terminals, and illustrates associations represented by the matrix A of Equation 13.

On the other hand, the matrix A becomes a matrix that is not feasible when the number of '1's in an arbitrary row is different from the number of ANs that one user-centric cell can have.

Meanwhile, the following cases are not general cases, but cases in which the matrix A is feasible.

Matrix A with columns composed of all '0's

Matrix A with columns composed of one or more '1's

Matrix A with columns composed all '1's

Hereinafter, a resource management method according to the present disclosure will be described. In a resource management method according to an exemplary embodiment of the present disclosure, assuming that M user-centric cells for M terminals are configured with a plurality of ANs, the CP may firstly determine the number K of orthogonal resource sharing groups for the M user-centric cells. The orthogonal resource sharing group refers to a group in which the same orthogonal resource is shared by the user-centric cells belonging to the corresponding group. That is, user-centric cells belonging to the same orthogonal resource sharing group may share the same orthogonal resource, and different orthogonal resources may be used between different orthogonal resource sharing groups.

Using the matrix expression A, a case in which overlapped cells exist may be expressed as a case where two or more '1's exist in the same column as shown in Equation 14 below.

$$\begin{pmatrix} \boxed{1} & 0 & \cdots & 0 \\ 0 & \ddots & & 1 \\ \vdots & & & \vdots \\ \boxed{1} & 1 & & 0 \\ 0 & & & 0 \\ 0 & 0 & \cdots & 0 \end{pmatrix}$$

[Equation 15]

When a specific column (i.e., a specific AN) has more than one 1 (i.e., a case in which overlapped ANs exist), the terminals (rows) corresponding to 1 should use resources that are orthogonal to each other. This is because an AN in a user-centric cell cannot serve multiple terminals at the same time. Therefore, a lower bound $k_{bwer}$ of K may be expressed as Equation 16 below.

$$K \geq \max\left\{k_n \in \mathbb{N} \mid k_n = \sum_{m=1}^{M} a_{m,n},\ n = 1, 2, \ldots, N\right\} = k_{bwer}$$

[Equation 16]

Here, max {·} represents the element with the maximum value in the set.

An upper bound $k_{upper}$ of K means a case in which all user-centric cells use orthogonal resources, and thus may be expressed as Equation 17 below.

$$K \leq M = k_{upper}$$

[Equation 17]

Accordingly, the number K of groups sharing orthogonal resources (i.e., the number of orthogonal resources) may have a maximum range expressed by Equation 18 below.

$$\max\left\{k_n \in \mathbb{N} \mid k_n = \sum_{m=1}^{M} a_{m,n},\ n = 1, 2, \ldots, N\right\} \leq K \leq M$$

[Equation 18]

It is most preferable that K having the above range has a lower bound value. This is because K determines the number of times of reuse of orthogonal resources, and as K increases, the number of times of reuse of resources for one orthogonal resource decreases, resulting in an effect of deteriorating overall network throughput. In other words, since the average of the number of times of resource reuse is expressed as M/K, as K increases for a given M, the number of times of resource reuse decreases, thereby increasing the probability that the spectral efficiency will deteriorate. Based on this consideration, in an exemplary embodiment of the present disclosure, the number K of groups may be determined according to the following procedure.

1) Obtain the range of K according to Equation 19.

[Equation 19]

$$k_{bwer} = \max\left\{k_n \in \mathbb{N} \mid k_n = \sum_{m=1}^{M} a_{m,n},\ n = 1, 2, \ldots, N\right\} \leq K \leq M = k_{upper}$$

2) If $k_{bwer} = k_{upper}$, determine $K = k_{bwer} = k_{upper}$, and if $k_{bwer} < k_{upper}$, proceed to a step 3).

3) Group each terminal by the following 'group header determination method' and 'per-group node addition method'.

4) After grouping, if all user-centric cells in a group do not overlap each other, determine the K value at this time as a final value and terminate the process. Otherwise, increase K by 1, and then return to the step 3).

Group Header Determination

A group header of an orthogonal resource sharing group that uses the k-th orthogonal resource among all K orthogonal resources may be defined as a user-centric cell to which the k-th orthogonal resource is allocated first among user-centric cells to which the k-th orthogonal resource is allocated. The group header may be determined according to the following procedure.

1) CP calculates a sum of weights between each of the M user-centric cells and all other user-centric cells that do not overlap the each of the M user-centric cells.

2) CP sorts the sums of weights of the M user-centric cells obtained in the step 1) in descending order.

3) The CP may select K user-centric cells having large sums of weights as K group headers.

Per-Group Node Addition

When the number of groups sharing the same orthogonal resource is determined and a group header initially included in each group is determined, a procedure of sequentially including ungrouped nodes in each group may proceed. Here, the node means a user-centric cell as described above.

In an exemplary embodiment of the present disclosure, a bipartite matching technique that provides a minimum sum of weights for a rectangular weight matrix may be used for this procedure. In this case, when calculating a weight between an already grouped node and an ungrouped node, a weight between overlapping nodes (i.e., user-centric cells including ANs that provide services to the same terminal) may be assumed to be ∞ (infinity). In an actual implementation, the weight ∞ may be set to a maximum value that can be represented by a variable storing the weight when the bipartite matching is performed. This serves to prevent nodes that cannot share the same resource due to overlapping from being included as new nodes of the group.

Figure 10:
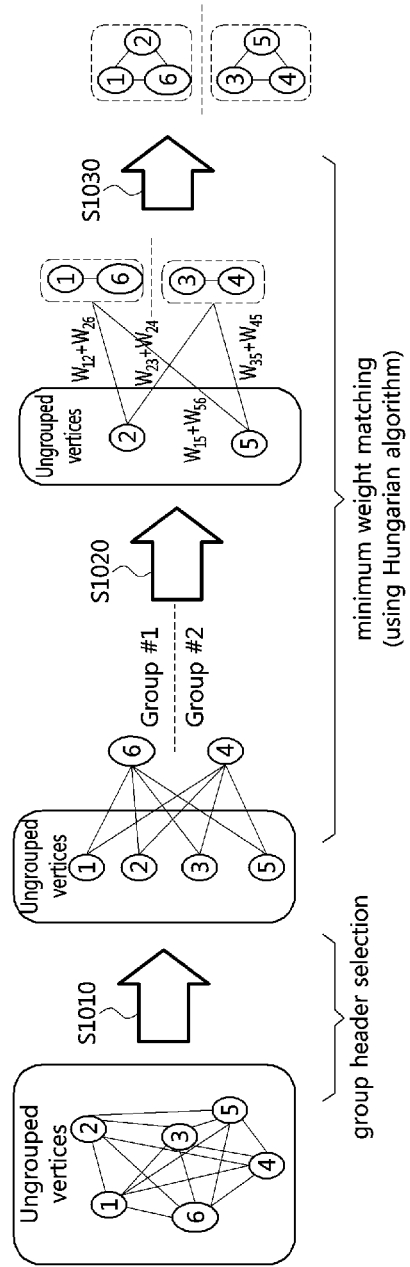
FIG. 10 is a conceptual diagram illustrating a process of adding user-centric cell groups when the number of orthogonal resource sharing groups is two according to an exemplary embodiment of the present disclosure.

FIG. 10 is a conceptual diagram illustrating a process of adding user-centric cell groups when the number of orthogonal resource sharing groups is two according to an exemplary embodiment of the present disclosure.

Referring to FIG. 10, when the number of orthogonal resource sharing groups is 2 and there are 6 user-centric cells (i.e., nodes), header determination and an order of adding nodes for each group are described.

The first step S1010 represents a process of determining a group header, showing that a user-centric cell 6 is selected as a header of a first group (i.e., group #1), and a user-centric cell 4 is selected as a header of a second group (i.e., group #2).

The second step S1020 shows a process in which a user-centric cell 1 is added to the first group and a user-centric cell 3 is added as a new member to the second group. Specifically, since the CP knows edge weights between all nodes, it knows a 4×2 matrix $W_{4,2}$ as shown in Equation 20 below, which represents the weights among ungrouped nodes 1, 2, 3, and 5 and the headers 6 and 4.

$$W_{4,2} = \begin{pmatrix} w_{16} & w_{14} \\ w_{26} & w_{24} \\ w_{36} & w_{34} \\ w_{56} & w_{54} \end{pmatrix}$$

[Equation 20]

When adding a new member node to each group, a node that minimizes the weight between the existing group header (e.g., node 6 or node 4) and the previously added node (e.g., node 1 or node 3) in the existing group may be added. This means adding a node that minimizes interference with the existing nodes included in the group, that is, minimizes capacity reduction. In this manner, since the new member added to the group always considers interference with the nodes that already exist in the group, the interference effect on the node representing the user-centric cell with lower performance may be actively considered compared to other nodes. Accordingly, the performance of the user-centric cell with lower performance may be improved. In addition, there is an effect of maximizing resource efficiency in given resources shared by the group.

The bipartite matching is to select two independent elements in the matrix $W_{4,2}$ that do not share a row and a column. In FIG. 10, the second step S1020 represents the bipartite matching, and the mapping of the node 1 to the orthogonal resource sharing group 1 and the node 3 to the orthogonal resource sharing group 2 means that $w_{16}+w_{34}$ is the minimum sum of weights in the matrix $W_{4,2}$ as shown in Equation 21 below. In the proposed method, as shown in Equation 21, independent elements having the minimum sum of weights may be selected and added to each group as a new member.

$$W_{4,2} = \begin{pmatrix} \boxed{w_{16}} & w_{14} \\ w_{26} & w_{24} \\ w_{36} & \boxed{w_{34}} \\ w_{56} & w_{54} \end{pmatrix}$$ [Equation 21]

The third step S1030 represents a process in which ungrouped nodes 2 and 5 are added to the group 1 and the group 2, respectively. Since the CP knows the edge weights between all nodes, it may calculate the total interferences that occur when the ungrouped nodes 2 and 5 are included in the respective groups, that is, when using the same resource used by the respective groups. For example, when the node 2 uses the same resource as the resource used by the group #1, the amount of interference equal to $w_{12}+w_{26}$ may be newly generated. In the same manner, when the nodes 2 and 5 use the same resource as the resource used by the groups #1 and #2, respectively, the total interferences may be expressed as a matrix $W_{2,2}$ of Equation 22 below.

$$W_{2,2} = \begin{pmatrix} \boxed{w_{12}+w_{26}} & w_{23}+w_{24} \\ w_{15}+w_{56} & \boxed{w_{35}+w_{45}} \end{pmatrix}$$ [Equation 22]

In the matrix $W_{2,2}$, a value of $(w_{12}+w_{26})+(w_{35}+w_{45})$ may be the minimum sum of independent elements. Accordingly, the node 2 may be newly added to the group #1 and the node 5 to the group #2, respectively.

When the number of elements in the weight matrix is small, such as $W_{4,2}$ and $W_{2,2}$, the independent elements having the minimum sum of weights can be selected by calculating the possible sums of weights. However, when the number of elements increases, such the exhaustive search becomes inappropriate. To this end, in another exemplary embodiment of the present disclosure, a so-called 'Hungarian algorithm' or 'extended Kuhn-Munkres (KM) algorithm', which is widely known as an optimization theory and applied to such the minimum sum-weight bipartite matching, may be used. In exemplary embodiments of the present disclosure, using the above algorithms, all user-centric cells may be grouped into K orthogonal resource groups through bipartite matching based on the minimum sum of weights. However, in the last match, M−floor(M/K)·K (i.e., (M modulo K)) user-centric cells instead of K user-centric cells may be grouped.

The Hungarian algorithm is an algorithm that solves an optimization problem that minimizes the sum of independent elements (elements that are not in the same row or column) included in a square matrix, and is applied to an optimization problem such as job assignment. Since the Hungarian algorithm is applied only to a square matrix, it cannot be applied directly to the weight matrix considered in the present disclosure. Therefore, in case of a non-square matrix, rows or columns having elements '0' may be added as needed to form a square matrix, and then the Hungarian algorithm may be applied. The method of applying the Hungarian algorithm by adding zero columns or rows as described above has a problem in that the computation time increases as the matrix size increases. Therefore, an extended Kuhn-Munkres (KM) algorithm may be used to reduce the computation time. The extended KM algorithm may be briefly described as a variation of the Hungarian algorithm applicable to a non-square matrix, and may provide up to about 10 times less computation than the Hungarian algorithm based on a square matrix. In the present specification, detailed descriptions of the Hungarian algorithm and the extended KM algorithm are omitted.

According to the above-described procedure, if all K orthogonal resource sharing groups are configured, the CP may divide the total system resources into K orthogonal resources and map one orthogonal resource to each group.

Figure 11:
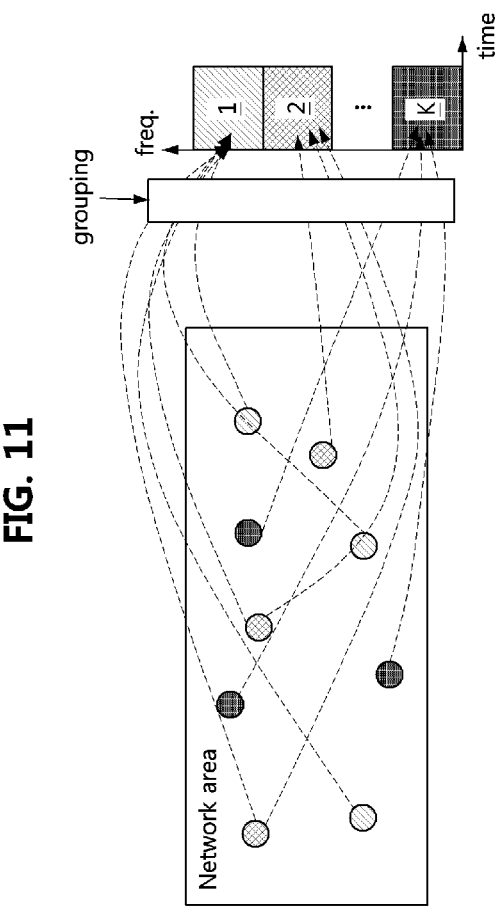
FIG. 11 is a conceptual diagram illustrating resource allocation for user-centric cells according to an exemplary embodiment of the present disclosure.

FIG. 11 is a conceptual diagram illustrating resource allocation for user-centric cells according to an exemplary embodiment of the present disclosure.

Referring to FIG. 11, the CP may divide the total system resources into K orthogonal resources in a frequency division multiplexing (FDM) scheme, and map user-centric cells (i.e., respective terminals) included in the same group to the same orthogonal resource. Through the mapping, final resource allocation to user-centric cells may be performed. In the mapping, a group index and an orthogonal resource index may be identically mapped, or a group index and an orthogonal resource index may be randomly mapped.

As shown in FIG. 11, according to an exemplary embodiment of the present disclosure, user-centric cells using the same orthogonal resource are evenly distributed and exist in the entire network area. This is because the orthogonal resource sharing groups are configured to minimize interference between user-centric cells sharing the same orthogonal resource, as described above.

FIG. 11 shows an example in which the total system resources are divided into orthogonal resources by the FDM scheme, but the total system resources may be divided by various schemes such as a time division multiplexing (TDM) scheme and a code division multiplexing (CDM) scheme, or a combination scheme in which the various schemes are combined.

The resource allocation according to the aforementioned resource management method may be repeatedly performed in units of T frames, which are a non-overlapped time window. Therefore, the CP may collect a data rate that each AN served to a specific terminal during T frames, measure a throughput of each terminal based thereon, and use the measured throughput to perform the proposed resource allocation procedures and methods.

Figure 12:
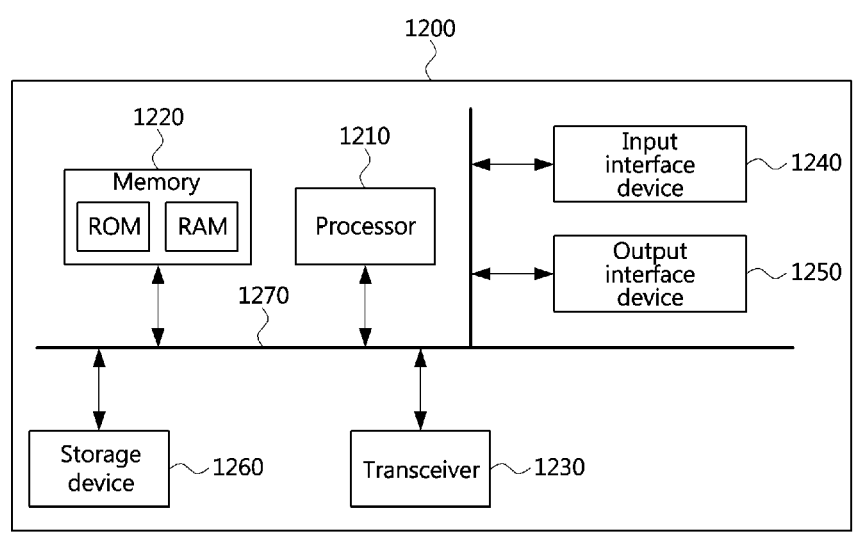
FIG. 12 is a block diagram illustrating a configuration of an apparatus for performing methods according to exemplary embodiments of the present disclosure.

FIG. 12 is a block diagram illustrating a configuration of an apparatus for performing methods according to exemplary embodiments of the present disclosure.

The apparatus shown in FIG. 12 may be a communication node (e.g., CP, AN, or terminal) for performing the methods according to the exemplary embodiments of the present disclosure.

Referring to FIG. 12, a communication node 1200 may include at least one processor 1210, a memory 1220, and a transceiver 1230 connected to a network to perform communication. In addition, the communication node 1200 may further include an input interface device 1240, an output interface device 1250, a storage device 1260, and the like. The components included in the communication node 1200 may be connected by a bus 1270 to communicate with each other.

The processor 1210 may execute at least one instruction stored in at least one of the memory 1220 and the storage device 1260. The processor 1210 may refer to a central processing unit (CPU), a graphics processing unit (GPU), or a dedicated processor on which the methods according to the exemplary embodiments of the present invention are performed. Each of the memory 1220 and the storage device 1260 may be configured as at least one of a volatile storage medium and a nonvolatile storage medium. For example, the memory 1220 may be configured with at least one of a read only memory (ROM) and a random access memory (RAM).

Referring to the C-RAN architecture shown in FIG. 3, the at least one processor 1210 and the memory 1220 in which the at least one instruction is stored may be included in the CN.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A resource management method performed by a central processor (CP), in a cloud radio access network (C-RAN) system configured with a plurality of access nodes (ANs) and the CP, the resource management method comprising:

configuring M user-centric cells for M terminals with the plurality of ANs, and determining a number K of orthogonal resource sharing groups sharing a same orthogonal resource, wherein M and K are natural numbers;

selecting K user-centric cells as group headers for the K orthogonal resource sharing groups, and adding the selected K user-centric cells as group headers to the K orthogonal resource sharing groups;

configuring the K orthogonal resource sharing groups by sequentially adding ungrouped user-centric cells to the K orthogonal resource sharing groups; and dividing total system resources into K orthogonal resources, and mapping the divided K orthogonal resources to the K orthogonal resource sharing groups, respectively.

2. The resource management method according to claim 1, wherein the CP includes base nodes (BNs) each of which corresponds to each of the plurality of ANs and a central node (CN) for centrally controlling the BNs.

3. The resource management method according to claim 2, wherein function-splitting is applied to each of the BNs and the ANs.

4. The resource management method according to claim 1, wherein the number K of the orthogonal resource sharing groups determines a number of reuses of orthogonal resources.

5. The resource management method according to claim 1, wherein the group headers are selected by:

calculating sums of weights for the M user-centric cells; and selecting user-centric cells corresponding to K largest sums of weights from the sums of weights for the M user-centric cells as the group headers.

6. The resource management method according to claim 5, wherein the weight is a weight reflecting an amount of interference between each of the M user-centric cells and each of user-centric cells that do not overlap with the each of the M user-centric cells, a throughput of a terminal associated with each of the M user-centric cells, and a throughput of a terminal associated with each of the user-centric cells that do not overlap with the each of the M user-centric cells.

7. The resource management method according to claim 6, wherein the amount of interference is measured by the terminal associated with each of the M user-centric cells, and reported to the CP.

8. The resource management method according to claim 6, wherein the amount of interference is estimated by the CP based on information on beams reported as optimal beams by the terminal associated with each of the M user-centric cells.

9. The resource management method according to claim 6, wherein the CP calculates the throughput of the terminal associated with each of the M user-centric cells by collecting information on an amount of data serviced to the terminal associated with each of the M user-centric cells during a predetermined time window.

10. The resource management method according to claim 1, wherein the ungrouped user-centric cells sequentially added to the K orthogonal resource sharing groups are determined using a bipartite matching technique.

11. The resource management method according to claim 10, wherein the bipartite matching technique is performed based on a Hungarian algorithm or an extended Kuhn-Munkres algorithm.

12. A central processor (CP), in a cloud radio access network (C-RAN) system configured with a plurality of access nodes (ANs) and the CP, the CP comprising:

at least one processor; and a memory storing at least one instruction executable by the at least one processor, wherein when executed by the at least one processor, the at least one instruction causes the at least one processor to:

configure M user-centric cells for M terminals with the plurality of ANs, and determine a number K of orthogonal resource sharing groups sharing a same orthogonal resource, wherein M and K are natural numbers;

select K user-centric cells as group headers for the K orthogonal resource sharing groups, and add the selected K user-centric cells as group headers to the K orthogonal resource sharing groups;

configure the K orthogonal resource sharing groups by sequentially adding ungrouped user- centric cells to the K orthogonal resource sharing groups; and divide total system resources into K orthogonal resources, and map the divided K orthogonal resources to the K orthogonal resource sharing groups, respectively.

13. The central processor according to claim 12, wherein the at least one instruction further causes the at least one processor to select the group headers by:

calculating sums of weights for the M user-centric cells; and selecting user-centric cells corresponding to K largest sums of weights from the sums of weights for the M user-centric cells as the group headers.

14. The central processor according to claim 13, wherein the weight is a weight reflecting an amount of interference between each of the M user-centric cells and each of user-centric cells that do not overlap with the each of the M user-centric cells, a throughput of a terminal associated with each of the M user-centric cells, and a throughput of a terminal associated with each of the user-centric cells that do not overlap with the each of the M user-centric cells.

15. The central processor according to claim 14, wherein the amount of interference is measured by the terminal associated with each of the M user-centric cells, and reported to the CP.

16. The central processor according to claim 14, wherein the CP calculates the throughput of the terminal associated with each of the M user-centric cells by collecting information on an amount of data serviced to the terminal associated with each of the M user-centric cells during a predetermined time window.

17. The central processor according to claim 12, wherein the ungrouped user-centric cells sequentially added to the K orthogonal resource sharing groups are determined using a bipartite matching technique.

* * * * *